United States Patent
Choi et al.

(10) Patent No.: US 10,268,521 B2
(45) Date of Patent: Apr. 23, 2019

(54) ELECTRONIC SYSTEM WITH DATA EXCHANGE MECHANISM AND METHOD OF OPERATION THEREOF

(71) Applicant: Samsung Electronics Co., Ltd., Suwon-si, Gyeonggi-Do (KR)

(72) Inventors: Inseok Stephen Choi, San Jose, CA (US); Yang Seok Ki, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 274 days.

(21) Appl. No.: 15/148,822

(22) Filed: May 6, 2016

(65) Prior Publication Data
US 2017/0212783 A1    Jul. 27, 2017

Related U.S. Application Data

(60) Provisional application No. 62/286,157, filed on Jan. 22, 2016.

(51) Int. Cl.
*G06F 9/46* (2006.01)
*G06F 9/50* (2006.01)

(52) U.S. Cl.
CPC .......... *G06F 9/5061* (2013.01); *G06F 9/5072* (2013.01)

(58) Field of Classification Search
CPC ........ G06F 9/5061; G06F 9/5072; G06F 9/46; G06F 9/5033; G06F 9/52; G06F 9/522
See application file for complete search history.

(56) References Cited

U.S. PATENT DOCUMENTS

| | | | |
|---|---|---|---|
| 7,818,548 B2 | 10/2010 | Hansen et al. | |
| 8,510,538 B1 * | 8/2013 | Malewicz | G06F 7/38 712/225 |
| 8,819,335 B1 | 8/2014 | Salessi et al. | |
| 8,972,986 B2 | 3/2015 | Palanisamy et al. | |
| 9,170,848 B1 * | 10/2015 | Goldman | G06F 9/5066 |
| 9,207,930 B2 | 12/2015 | Srivas et al. | |
| 9,389,995 B2 * | 7/2016 | Hu | G06F 12/00 |
| 9,665,404 B2 * | 5/2017 | Hu | G06F 12/00 |
| 9,740,706 B2 * | 8/2017 | Cramer | G06F 17/30203 |

(Continued)

OTHER PUBLICATIONS

Dean et al. "MapReduce: Simplified Data Processing on Large Clusters", Google, Inc.; 2004 (Dean_2004.pdf; pp. 1-13).*

(Continued)

*Primary Examiner* — Hiren P Patel
(74) *Attorney, Agent, or Firm* — Perspectives Law Group, Corp.

(57) ABSTRACT

A electronic system includes: a cluster manager configured to: divide a user program into a group of parallel execution tasks, and generate shuffling metadata to map intermediate data and processed data from the parallel execution tasks; a shuffling cluster node, coupled to the cluster manager, configured to: store the shuffling metadata by an in-storage computer (ISC), and incrementally shuffle each of the sub-packets of the intermediate data and the processed data, by the ISC, based on the shuffling metadata when the parallel execution task is in process; and a local storage, coupled to the shuffling cluster node and mapped through the shuffling metadata, for receiving the sub-packets of the processed data from the shuffling cluster node.

20 Claims, 5 Drawing Sheets

(56) References Cited

U.S. PATENT DOCUMENTS

| | | | | |
|---|---|---|---|---|
| 9,747,127 B1* | 8/2017 | Florissi | | G06F 17/30067 |
| 9,858,191 B2* | 1/2018 | Choi | | G06F 12/0862 |
| 9,928,263 B2* | 3/2018 | Balikov | | G06F 17/30345 |
| 2013/0297624 A1* | 11/2013 | Raghunathan | | G06F 17/30675 |
| | | | | 707/752 |
| 2014/0059552 A1* | 2/2014 | Cunningham | | G09G 5/00 |
| | | | | 718/102 |
| 2014/0064066 A1* | 3/2014 | Lumezanu | | H04L 47/12 |
| | | | | 370/229 |
| 2014/0115560 A1* | 4/2014 | Hutchison | | G06F 8/451 |
| | | | | 717/113 |
| 2014/0123115 A1* | 5/2014 | Peretz | | G06F 11/362 |
| | | | | 717/127 |
| 2014/0215003 A1* | 7/2014 | Mizobuchi | | G06F 15/17331 |
| | | | | 709/213 |
| 2014/0358977 A1* | 12/2014 | Cramer | | G06F 17/30203 |
| | | | | 707/827 |
| 2014/0372438 A1* | 12/2014 | Chandramouli | | G06F 17/30598 |
| | | | | 707/737 |
| 2014/0372611 A1* | 12/2014 | Matsuda | | H04L 45/12 |
| | | | | 709/225 |
| 2015/0074115 A1* | 3/2015 | Vasu | | G06F 17/30575 |
| | | | | 707/741 |
| 2015/0128150 A1* | 5/2015 | Ueda | | G06F 9/5066 |
| | | | | 718/105 |
| 2015/0150017 A1* | 5/2015 | Hu | | G06F 12/00 |
| | | | | 718/103 |
| 2015/0169683 A1* | 6/2015 | Chandramouli | | G06F 17/30551 |
| | | | | 707/713 |
| 2015/0195344 A1* | 7/2015 | Surendran | | H04L 67/10 |
| | | | | 709/201 |
| 2015/0227394 A1* | 8/2015 | Chin | | G06F 9/5066 |
| | | | | 718/104 |
| 2015/0227399 A1* | 8/2015 | Chin | | G06F 12/00 |
| | | | | 718/107 |
| 2015/0312335 A1* | 10/2015 | Ying | | H04L 67/1061 |
| | | | | 709/201 |
| 2016/0034205 A1* | 2/2016 | Mehra | | G06F 3/061 |
| | | | | 711/153 |
| 2016/0103845 A1* | 4/2016 | Yeddanapudi | | G06F 17/30076 |
| | | | | 707/756 |
| 2016/0188477 A1* | 6/2016 | Choi | | G06F 12/0862 |
| | | | | 711/137 |
| 2016/0364273 A1* | 12/2016 | Liu | | G06F 9/5066 |
| 2017/0004163 A1* | 1/2017 | Gupta | | G06F 17/30483 |
| 2017/0083588 A1* | 3/2017 | Lang | | G06F 17/30436 |
| 2017/0090993 A1* | 3/2017 | Malewicz | | G06F 9/5077 |
| 2017/0103084 A1* | 4/2017 | Liu | | G06F 9/544 |
| 2017/0235699 A1* | 8/2017 | Dalal | | G06F 13/4234 |
| | | | | 710/110 |
| 2017/0371544 A1* | 12/2017 | Choi | | G06F 3/0685 |

OTHER PUBLICATIONS

Kapil Bakshi; "Consideration for Big Data: Architecture and Approach", Cicso Systems Inc, 2012; (Bakshi_2012.pdf; pp. 7).*

Herodotos Herodotou; "Hadoop Performance Modles", Duke university, 2011; (Herodotos_2011.pdf; pp. 1-16).*

* cited by examiner

ELECTRONIC SYSTEM WITH DATA EXCHANGE MECHANISM AND METHOD OF OPERATION THEREOF

CROSS REFERENCE TO RELATED APPLICATION(S)

This application claims the benefit of U.S. Provisional Patent Application Ser. No. 62/286,157 filed Jan. 22, 2016, and the subject matter thereof is incorporated by reference herein.

TECHNICAL FIELD

An embodiment of the present invention relates generally to an electronic system, and more particularly to a system for data exchange functions for electronic systems.

BACKGROUND

Modern electronic systems rely on rapid execution of user programs and manipulation of data. The majority of distributed cluster computing is based on dataflow programming models. Hadoop™ and Spark™ are representative examples of platforms for distributed cluster computing. One feature in the dataflow programming model is that data and worker mappings are predefined, allowing the execution to be controlled by a cluster manager. Moreover, Hadoop™ and Spark™ aggressively cache data to utilize data locally. Such caching systems are usually based on software caching mechanisms that use large amounts of memory to contain input data and intermediate data.

In manipulating the data, the master controller initiates a shuffle of data between nodes of the cluster. The shuffle causes an instant bottle-neck of data attempting to traverse to the next processing location in the cluster. This is because the existing shuffle engine is centralized and synchronized. Each synchronized shuffle creates a barrier to parallel programming and execution. Therefore, the shuffle of the data can delay execution and cause large power spikes during the movement of the data. This spike in activity can cause over-investment in power and switching resources as well as delays in the execution of the user program.

Thus, a need still remains for electronic system with data exchange mechanism to improve execution reliability and performance in clustered computing environments. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a cluster manager configured to: divide a user program into parallel execution tasks and synchronization/shuffle procedures(/tasks), and generate shuffling metadata to map intermediate data and processed data from the parallel execution tasks; a shuffling cluster node, coupled to the cluster manager, configured to: store the shuffling metadata by an in-storage computer (ISC), and incrementally shuffle each of the sub-packets of the intermediate data and the processed data, by the ISC, based on the shuffling metadata when the parallel execution task is in process; and a local storage, coupled to the shuffling cluster node and mapped through the shuffling metadata, for receiving the sub-packets of the processed data from the shuffling cluster node.

An embodiment of the present invention provides a method of operation of an electronic system including: configuring a cluster manager for: dividing a user program into a group of parallel execution tasks and shuffle task, and generating shuffling metadata for mapping intermediate data and processed data from the parallel execution tasks; configuring a shuffling cluster node for: storing the shuffling metadata, and incrementally shuffling each of the sub-packets of the intermediate data and the processed data based on the shuffling metadata when processing the parallel execution tasks; and mapping a local storage, through the shuffling metadata, for receiving the sub-packets of the processed data from the shuffling cluster node.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
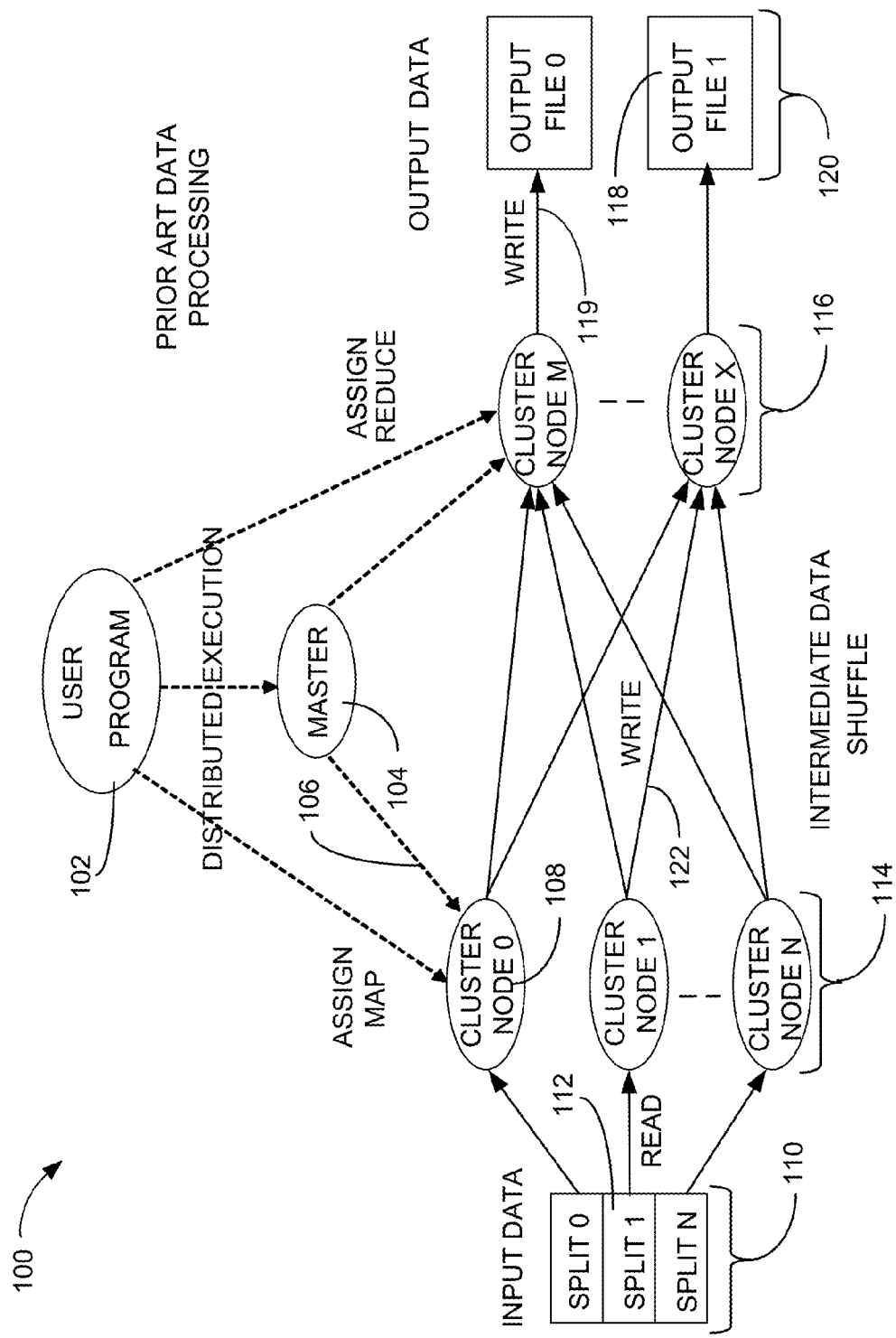
FIG. 1 is an architectural block diagram of a cluster computing system with data shuffling.

Various embodiments provide a data exchange mechanism for distributed cluster computing that can simplify the distributed input/output (I/O) interface and maximize the execution efficiency of the electronic system by establishing timely exchanges of the intermediate data. The execution of the data exchanges can be monitored and analyzed in order to initiate the execution of subsequent tasks that can minimize the activity at the local storage, minimize congestion at the communication interface, and provide the maximum program execution efficiency.

Various embodiments provide a new data exchange mechanism for a distributed cluster computing framework based on a data flow model that generates autonomous data shuffling between the cluster nodes. The data exchange mechanism also monitors and profiles task behavior based on the autonomous data shuffling. The cluster nodes include an in-storage compute (ISC) storage device, which is enabled to exchange intermediate data to a destination node as soon as an intermediate parallel task is complete and the destination node has the capacity to accept the data exchange. The cluster node can monitor task progress with appropriate granularity and trigger the data exchange based on completion of the intermediate parallel task generated during execution of the tasks.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The term "unit" referred to herein is a circuit formed of hardware components or hardware state machines used for specific functions that are timing critical and do not include software functions or support.

Referring now to FIG. 1, therein is shown an architectural block diagram of a cluster computing system 100 with data shuffling. The electronic system 100 includes a user program 102, such as an application program. The user program 102 can be used for data processing in a prior art distributed cluster computing environment.

A master controller 104 can analyze the user program 102 for assigning repetitive tasks 106 across a number of cluster nodes 108. The master controller 104 can be a processor, a microprocessor, a core processor, a computer, or a server, that can parse the user program 102 and coordinate the execution by the cluster nodes 108. The cluster nodes 108 can be a processor, a microprocessor, a core processor, a computer, or a server, that can be assigned a repetitive task that is a portion of the user program 102.

The master controller 104 can plan the parsing of input data 110 into splits 112. The splits 112 can be a portion of the input data 110 that applies to the particular task assigned individually to the cluster node 108. The input data 110 can be parsed to allow each of the cluster nodes 108 to perform the same process on the input data 110 within its assigned split 112. The input data 110 can be all or a portion of the data that is required to process the user program 102 to a successful completion.

It is understood that any number of the cluster nodes 108 can be managed by the master controller 104. The master controller 104 can assign a number of the cluster nodes 108 to perform as pre-processing clients 114 and post-processing clients 116. The pre-processing clients 114 can be the cluster nodes 108 that are assigned to process the split 112 from the input data 110 for generating intermediate data 122. The intermediate data 122 can be a first partial result of processing the input data 110, for the user program 102, by the pre-processing clients 114.

The post-processing clients can be the cluster nodes 108 that are assigned to process the intermediate data 122 and generate processed data 119 as a portion of the result of executing the user program 102 on the input data 110. In a deterministic mapping of the input data 110 and the pre-processing clients 114, the master controller 104 can assign a reduced number of the post-processing clients 116 to generate output files 118, from the processed data 119, to be stored in a local storage 120.

The pre-processing clients 114, can include non-volatile random access memory (NVRAM), solid state drives (SSD), or hard disk drives (HDD), that can hold the intermediate data 122 until the completion of the split 112. It is understood that the split 112 can include several intermediate parallel tasks that can be related but are autonomous. The intermediate parallel tasks can complete in order while the split 112 is not considered complete until all of the intermediate parallel tasks are completed.

The master controller 104 can shuffle the intermediate data 122 to the post-processing clients 116 for further processing based on the requirements of the user program 102. The post-processing clients 116 can execute their parallel execution tasks to generate the processed data 119. The processed data 119 can be a portion of the output files 118 that are generated by one of the post-processing clients 116. The compilation of the processed data 119 from the post-processing clients 116 can form the output files 118.

It is understood that the master controller 104 can provide a deterministic mapping of the input data 110 and the pre-processing clients 114 in order to provide an efficient execution of the user program 102. Each of the pre-processing clients 114 can perform a specific task on the assigned split 112 of the input data 110. The coordination of the shuffle of the intermediate data 122 and the execution of the post-processing clients 116 can be coordinated by the master controller 104. The master controller 104 can utilize monitoring and profiling of the execution of the pre-processing clients 114 and the post-processing clients 116 in order to enable the shuffle of the intermediate data 122.

It is understood that the gating of the shuffle of the intermediate data 122 by the master controller 104 can cause congestion between the pre-processing clients 114 and the post-processing clients 116 because all of the communication resources are activated at the same time. Since each of the post-processing clients 116 can receive input from multiple of the pre-processing clients 114, a conflict can occur for the interface resources of the post-processing clients 116 as well. None of the next level intermediate parallel task execution at the post-processing clients 116 can begin without having the intermediate data 122 from each of the pre-processing clients 114.

Figure 2:
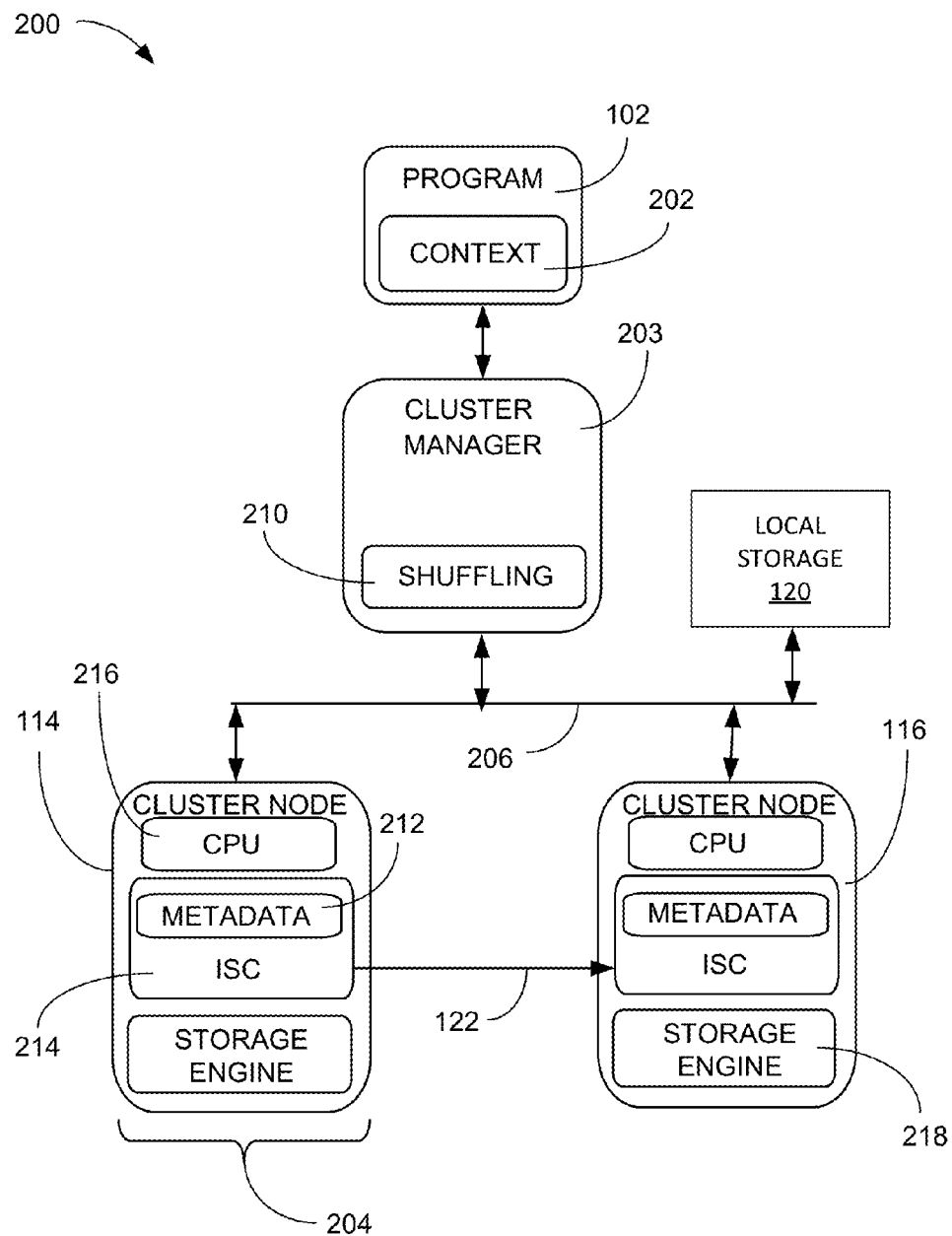
FIG. 2 is a functional block diagram of an electronic system with data exchange mechanism in an embodiment.

Referring now to FIG. 2, therein is shown a functional block diagram of an electronic system 200 with a data exchange mechanism in an embodiment of the present concepts. The functional block diagram of an electronic system 200 with the data exchange mechanism depicts the user program 102 providing an execution context 202 for a cluster manager 203, such as a cluster node manager or a coordinating controller, for dividing the user program 102 into a group of parallel execution tasks. The operation of the cluster manager 203 differs from that of the master controller 104 because the cluster manager 203 can be programmatically altered to support a shuffling cluster node 204. The alteration can be performed by a device driver of script program that allows the cluster manager 203 to allow the shuffling cluster node 204 to shuffle the intermediate data 122 without the control of the cluster manager 203. The execution context 202 can include a list of requirements that apply to the execution of the user program 102. The execution context 202 can specify execution order of the routines within the user program 102. The cluster manager 203 can allocate the shuffling cluster node 204 as one of the pre-processing clients 114 or the post-processing clients 116 based on the needs of the execution context 202 in order to parse the user program 102 among the cluster nodes 204.

The cluster manager 203 can communicate with the shuffling cluster node 204 through a communication bus 206, such as a dedicated wired bus, a multi-connection bus, a network bus, or a wireless network connection. The cluster manager 203 can use the communication bus 206 to assign the shuffling cluster node 204 a parallel execution task as the pre-processing clients 114 or the post-processing clients 116, and to monitor their progress in the execution of the parallel execution task. The communication bus 206 can be a bidirectional bus for communicating assignments, status, and metadata between the shuffling cluster node 204 and the cluster manager 203. The embodiment of the communication bus 206 can include a network, having a communication protocol, or a dedicated register port, in the shuffling cluster node 204, that can be written and read by the cluster manager 203.

A shuffling control unit 210, within the cluster manager 203, can provide shuffling metadata 212 for accessing and shuffling the user data for the execution of the user program 102 in accordance with the execution context 202. The shuffling metadata 212 can include a destination address and a size for each transfer of the intermediate data 122. The shuffling metadata 212 can define a shuffling task for each of the sub-tasks of the parallel execution tasks including a destination address and a transfer size. The shuffling control unit 210 can perform the initial partition of the user program 102 in order to provide the shuffling metadata 212 to the appropriate ones of the pre-processing clients 114 and the post-processing clients 116. The shuffling control unit 210 can deliver the shuffling metadata 212 to an in-storage computer (ISC) 214 of the shuffling cluster node 204. The shuffling control unit 210 can provide the shuffling metadata 212 to the ISC 214 based on the execution of the user program 102 by the pre-processing clients 114 and the post-processing clients 116. The shuffling metadata 212 can provide destination addresses and size for data sub-packets of the intermediate data 122.

Each of the shuffling cluster node 204 can include the ISC 214, such as a processor, embedded processor, micro-processor, or sequencer, as it executes the portion of the user program 102 assigned by the cluster manager 203. The ISC 214 can track task progress as a node central processing unit (CPU) 216 executes the parallel execution tasks assigned to the shuffling cluster node 204. The node CPU 216 can be a processor, embedded processor, micro-processor, a hardware state machine, sequential logic processor, combinational logic, or sequencer that executes the parallel execution tasks assigned by the cluster manager 203. It is understood that in an embodiment, the functions of the ISC 214 and the node CPU 216 can be performed by the same device.

The node CPU 216 can retrieve the split 112 of FIG. 1 from the local storage 120 and store the split 112 in a node storage engine 218. The node storage engine 218 can also store the parallel execution tasks sent to the shuffling cluster node 204 by the cluster manager 203. The node storage engine 218 can be coupled to both the node CPU 216 and the ISC 214. The node CPU 216 can access the node storage engine 218 for retrieving the splits 112 of the input data 110 of FIG. 1. The node storage engine 218 can include an on-board cache memory, execution memory, status memory, or a combination thereof. The node storage engine 218 can also include a storage interface that couples the shuffling cluster node 204 to others of the shuffling cluster node 204 or the local storage 120.

The node storage engine 218 can be initialized by the node CPU 216 based on the execution context 202 parsed from the user program 102. During the execution user program 102, the node CPU 216 can receive updates from the execution tracker unit 208, the shuffling control unit 210 including the shuffling metadata 212 for executing the input data and shuffling the intermediate data 122 between the pre-processing clients 114 or the post-processing clients 116. The node storage engine 218 can write the intermediate data 122 or the processed data 119 of FIG. 1 depending on the assignment of the shuffling cluster node 204 as the pre-processing clients 114 or the post-processing clients 116.

It is understood that the input data 110 and the intermediate data 122 can be maintained in the node storage engine 218 until the ISC 214 exchanges the intermediate data 122 between the pre-processing clients 114 and the post-processing clients 116 in the distributed cluster computing environment. The cluster manager 203 can be responsible for allocation of the storage capacity for the splits 112 and the intermediate data 122 through the shuffling metadata 212.

It has been discovered that an embodiment of the node CPU 216 can sequentially execute the sub-tasks of the parallel execution task based on the input from the shuffling metadata 212 including the size of an intermediate data sub-packet and a destination address. The shuffling cluster node 204 can incrementally exchange sub-packets of the intermediate data 122 upon completion of each of the sub-tasks of the parallel execution task, without intervention of the cluster manager 203, based on the shuffling metadata 212. It has also been discovered that the ISC 214 can shorten the execution time of the user program 102 by eliminating the congestion and need for a data shuffle period coordinated by the master controller 104 of FIG. 1. The congestion caused by the concurrent shuffling of all the intermediate data 122, as controlled by the cluster manager 203, can delay the execution time of the user program 102.

It is understood that the shuffling cluster node 204 can be implemented in in a single device, such as an ISC solid state drive (SSD) 204. The ISC SSD 204 can provide the computational, storage, and data exchange resources necessary to implement the electronic system 200. The communication between the cluster manager 203 and the ISC SSD 204 can include control commands including create, start/stop, pause/resume, and shuffle. The ISC SSD 204 can shuffle the intermediate data sub-packet of the intermediate data 122 as soon as each of the sub-tasks is completed without receiving a shuffle command from the cluster manager 203. The ISC SSD 204 can immediately shuffle the intermediate data 122, upon completion of each the sub-tasks, based on the destination address provided by the shuffling metadata 212.

Figure 3A:
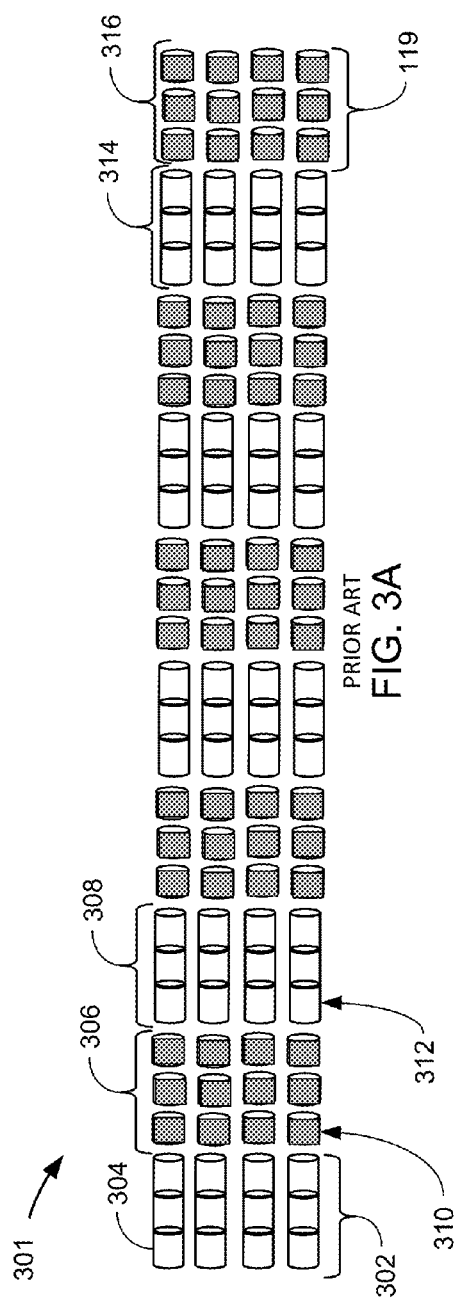
FIG. 3A and FIG. 3B, therein are shown an exemplary sequence diagram of the execution of the user program by the cluster computing system and an electronic system with data exchange mechanism in an embodiment.
Figure 3B:
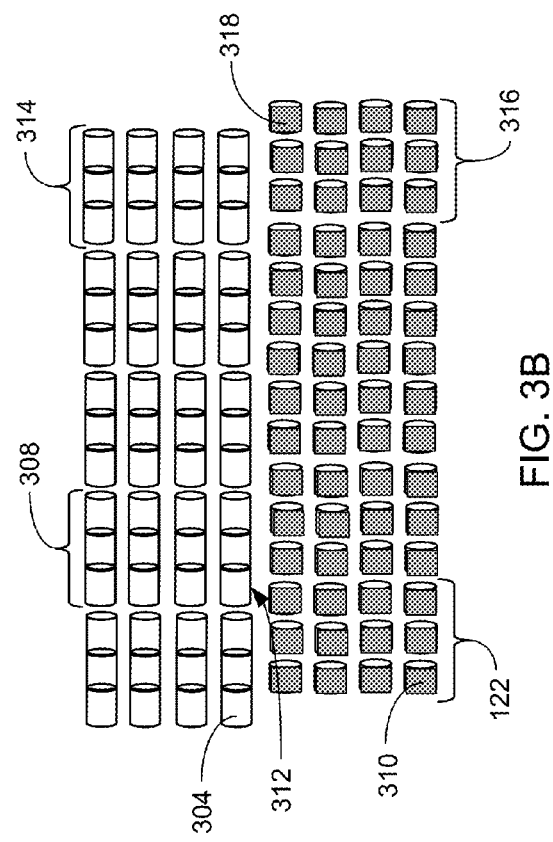

Referring now to FIG. 3A and FIG. 3B, therein are shown an exemplary sequence diagram 301 of the execution of the user program by the cluster computing system 100 and an electronic system 200 with data exchange mechanism in an embodiment. As shown in FIG. 3A, the exemplary sequence diagram of the execution of the user program 102 by the prior art cluster computing system 100 can include a parallel execution task 302, distributed among a number of the cluster nodes 108 of FIG. 1. The master controller 104 of FIG. 1 can monitor the execution of the parallel execution task 302 by collecting the status of sub-tasks 304 in each of the cluster nodes 108. When the last of the cluster nodes 108 completes the parallel execution task 302, the master controller 104 can initiate a data shuffle interval 306, during which none of the subsequent task 308 can be executed. It is understood that the parallel execution task 302 can be a portion of the user program 102 that will be executed repeatedly by one of the cluster nodes 108. Each of the parallel execution task 302 can be a portion of the user program 102 that is repeatedly executed on different segments of the input data 110 of FIG. 1. Each of the iterations can make-up the sub-tasks 304 and can produce an intermediate data sub-packets 310.

It is understood that the data shuffle interval 306 can be exaggerated and extended if several of the cluster nodes 108 are scheduled to transfer the intermediate data sub-packets 310 to a single one of the cluster nodes 108, which must occur sequentially and can cause congestion that delays the end of the data shuffle interval 306. Since all of the cluster nodes 108 attempt to transfer the intermediate data sub-packets 310 at the same time, additional interconnect hardware can be required to complete the data shuffle interval 306 in a timely manner.

The intermediate data sub-packets 310 can provide the input data to an initial sub-task 312 of the subsequent task 308. The execution of the initial sub-task 312 of the subsequent task 308 must be delayed until the completion of the data shuffle interval 306.

As the execution of the user program 102 of FIG. 1 progresses, an output task 314 can generate the processed data 119, which can be transferred to the local storage 120 of FIG. 1 during a file construction interval 316. The processed data 119 can be ordered in the local storage 120 in order to create the output files for the user program 102.

In contrast, FIG. 3B shows the execution of the same user program 102 by the electronic system 200. The node CPU 216 of FIG. 2 can execute the parallel execution task 302, while having the ISC 214 of FIG. 2 incrementally transfer the intermediate data sub-packets 310 as soon as the node CPU 216 completes each of the sub-task 304. It is understood that in an embodiment, the functions of the ISC 214 and the node CPU 216 can be performed by the same device. The ISC 214 can transfer the intermediate data sub-packets 310 in an independent transfer, while the node CPU 216 executes the next one of the sub-task 304 in the parallel execution task 302. In an embodiment, the node CPU 216 can set-up the transfer of the intermediate data sub-packets 310 based on a destination address in the shuffling metadata 212 and then execute the next one of the sub-task 304 in the parallel execution task 302. The shuffling metadata 212 can define a shuffling task for each of the intermediate data sub-packets 310 generated by the sub-tasks 304 of the parallel execution tasks 302 including providing a destination address and a transfer size. The incremental nature of the sub-task 304 can also shuffle the intermediate data sub-packets 310, while the next of the sub-task 304 is executed. The incremental shuffling of the intermediate data sub-packets 310, as soon as the sub-task 304 that produced it is complete, can prevent the congestion shown in the data shuffle interval 306 of FIG. 3A.

By way of an example, the sub-tasks 304 can produce the intermediate data sub-packets 310. The intermediate data sub-packets 310 can be exchanged by the ISC 214 to the cluster node 204 that will execute the initial sub-task 312 of the subsequent task 308. The asynchronous nature of the execution of the sub-tasks 304 can distribute the exchange of the intermediate data sub-packets 310 without creating congestion of the transfer hardware (not shown). Further the distribution of the sub-tasks 304 can assure that the intermediate data sub-packets 310 is available to the node CPU 204 before the initial sub-task 312 of the subsequent task 308 is ready to execute.

The ISC 214 can utilize the destination address for each of the intermediate data sub-packets 310 provided by the shuffle metadata 212 of FIG. 2 to initiate the transfer of the intermediate data sub-packets 310 to the appropriate cluster node 204 of FIG. 2 that is scheduled to execute the initial sub-task 312 of the subsequent task 308. As a result of the incremental transfer of the intermediate data sub-packets 310 as soon as the sub-task 304 that produces it has completed, the data shuffle interval 306 is eliminated and the subsequent task 308 can be executed with no delay from the parallel execution task 302.

The output task 314 can be overlapped with the file construction interval 316. As each of the sub-tasks 304 of the output task 314 generates the processed data 119, the ISC 214 can transfer output sub-packets 318 to the local storage 120 as they are completed. The node CPU 216 can execute the output task 314 to compile the output files of the user program 102. The ISC 214 can access the shuffle metadata 212 in order to correctly position the output sub-packets 318 in the local storage 120.

It has been discovered that an embodiment of the electronic system 200 with data exchange mechanism utilizing the shuffle metadata 212 can significantly reduce the execution time of the user program 102 by eliminating the data shuffle interval 306 and transferring the intermediate data sub-packets 310 as soon as the node CPU 216 has completed the sub-tasks 304. The overlap of the file construction interval 316 with the output task 314 can further reduce the execution time of the user program 102.

Figure 4:
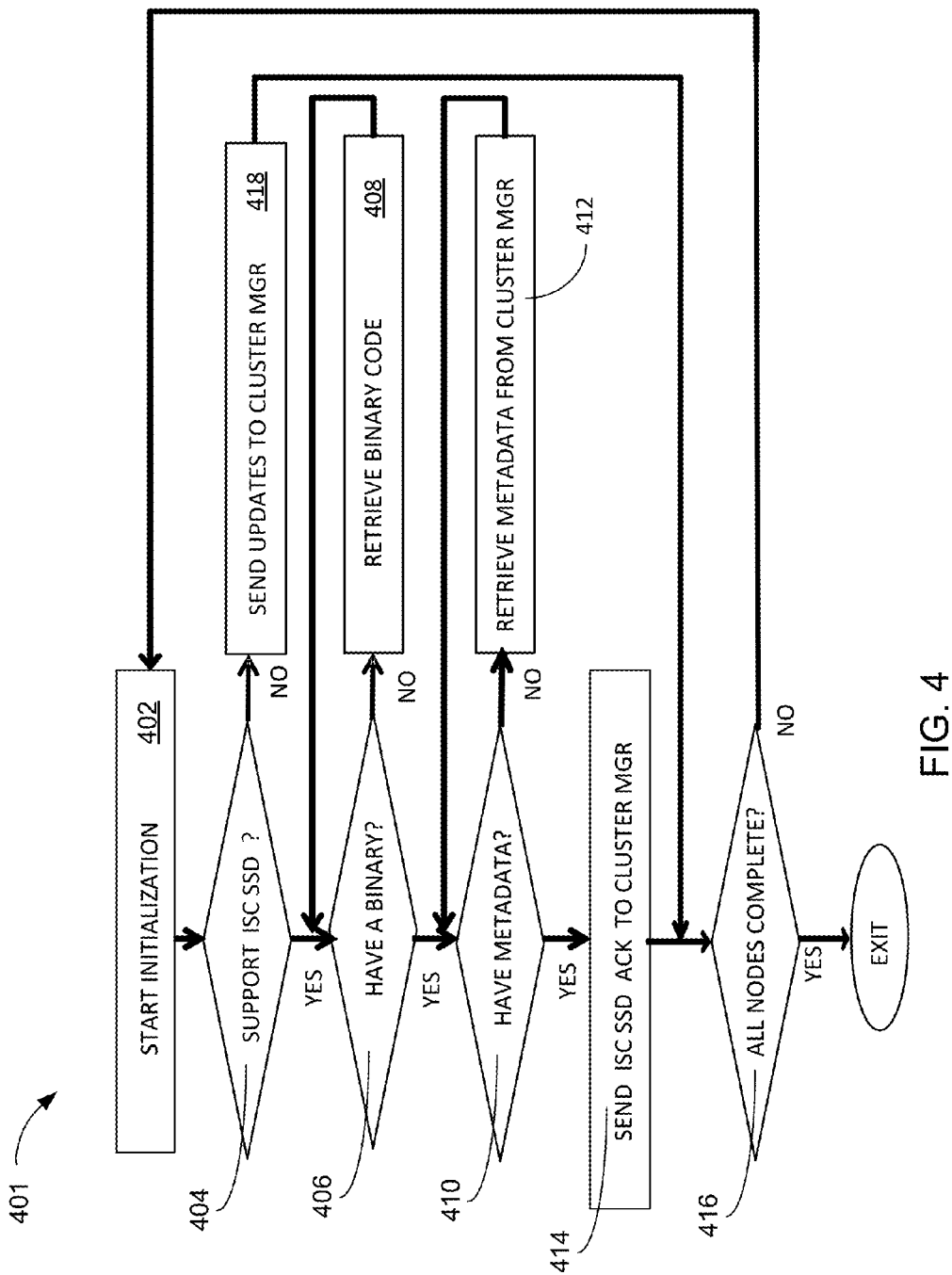
FIG. 4 is a flow chart of an initialization of the electronic system in an embodiment.

Referring now to FIG. 4, therein is shown a flow chart of an initialization 401 of the electronic system 200 in an embodiment. The flow chart of an initialization 401 of the electronic system 200 depicts a start initialization block 402, in which the cluster manager 203 of FIG. 2 can partition the user program 102 of FIG. 2. The cluster manager 203 can assign the pre-processing clients 114 of FIG. 1 and the post-processing clients 116 of FIG. 1 to support the partition of the user program 102. The flow then proceeds to a support ISC SSD block 404.

The support ISC SSD block 404 can determine whether the cluster node being addressed is the ISC SSD 204 of FIG. 2 and is capable of the incremental exchange of the intermediate data 122 of FIG. 1. If the cluster manager 203 is coupled to the ISC SSD 204, the flow proceeds to a have binary block 406, in which the presence of the executable portion of the user program 102 is checked.

If the binary code has not been loaded into the ISC SSD 204 the flow proceeds to a retrieve binary code block 408. The retrieve binary code block 408 can initiate the loading of the parallel execution task 302 of FIG. 3 of the user program 102. The cluster manager 203 can download the executable partition of the user program 102 to the ISC SSD 204 that is in the initialization process. The flow then returns to the have binary block 406 to verify the download of the parallel execution task 302 from the user program 102 has been loaded. The flow then proceeds to a have metadata check block 410. If the shuffle metadata 212 of FIG. 2 has not been loaded, the flow proceeds to a retrieve metadata from cluster manager block 412.

In the retrieve metadata from cluster manager block 412, the ISC SSD 204 can initiate the loading of the shuffle metadata 212 from the cluster manager 203. The cluster manager 203 can download the shuffle metadata 212 for the current mapping of the pre-processing clients 114 of FIG. 1, the post-processing clients 116 of FIG. 1, and the local storage 120 of FIG. 1. The shuffle metadata 212 can include the transition mapping of the intermediate data sub-packets 310 of FIG. 3 and the output sub-packets 318 of FIG. 3. The flow then returns to the have metadata check block 410 to verify the shuffle metadata 212 has properly loaded.

The flow then proceeds to send ISC SSD acknowledge to cluster manager block 414. The send ISC SSD acknowledge to the cluster manager block 414 can alert the cluster manager 203 that the ISC SSD 204 is initialized and ready to execute the parallel execution task 302 or the subsequent task 308 of FIG. 3. It is understood that each of the ISC SSD 204 can execute a different partition of the user program 102 as assigned by the cluster manager 203. The parallel execution task 302 or the subsequent task 308 can represent the partition of the user program 102 loaded into one of the ISC SSD 204 coupled to the cluster manager 203.

The flow then proceeds to an all nodes complete check 416. If all of the ISC SSD 204 coupled to the cluster manager 203 have been initialized with the parallel execution task 302 and the shuffle metadata 212, the flow exits. If more of the ISC SSD 204 remain uninitialized, the flow returns to the start initialization block 402 to initialize the next ISC SSD 204 in the coupling map maintained in the cluster manager 203.

In the support ISC SSD block 404, if the cluster nodes 108 of FIG. 1 are not the ISC SSD 204 the flow proceeds to a send updates to cluster manager 418. The cluster manager 203 can continue to identify all of the cluster nodes 108. Upon verifying that not all of the cluster nodes 108 coupled to the cluster manager 203 are the ISC SSD 204, the execution of the user program 102 can revert to the prior art operation as shown in FIG. 3A. The cluster manager 203 can take over the data shuffle intervals 306 including assigning the data exchanges for executing the user program 102.

It has been discovered that the electronic system 200 with data exchange mechanism can accelerate the execution of the user program 102 by eliminating the data shuffle intervals 306 and allowing the continuous execution of the parallel execution tasks 302. The initialization 401 can accommodate the configuration of the ISC SSD 204 or the cluster nodes 108 for executing the user program 102.

Figure 5:
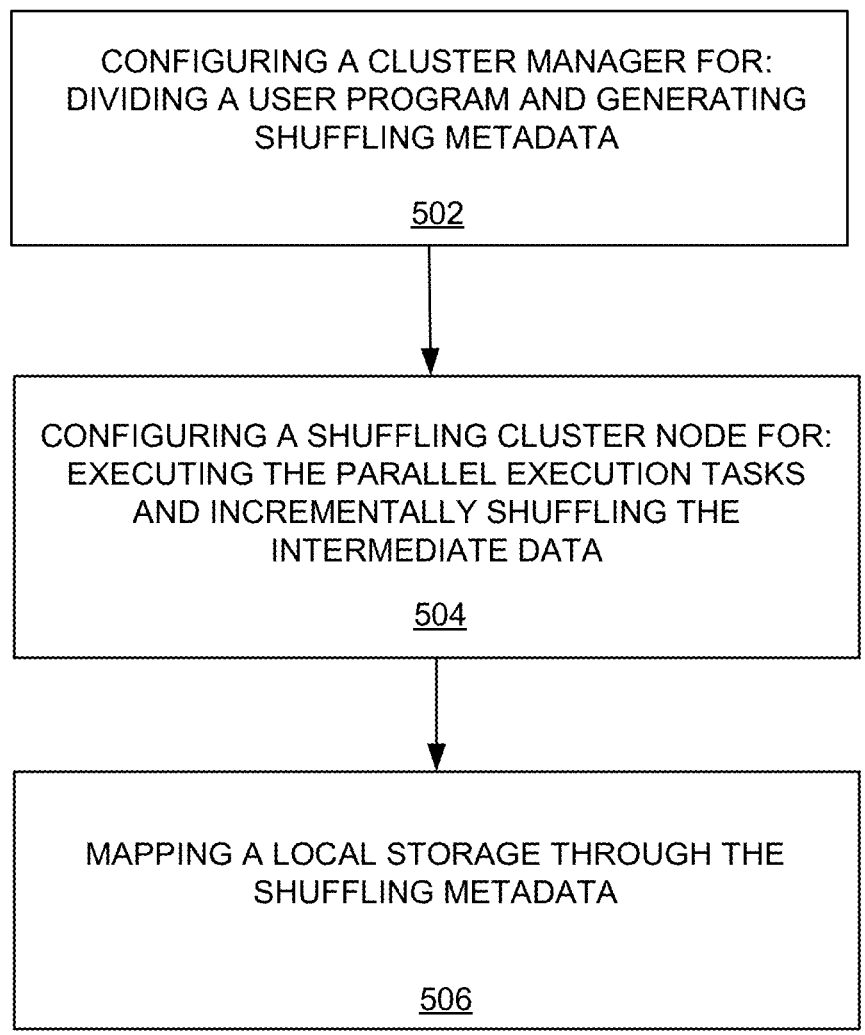
FIG. 5 is a flow chart of a method of operation of an electronic system in a further embodiment of the present invention.

Referring now to FIG. 5, therein is shown a flow chart of a method 500 of operation of an electronic system 200 in a further embodiment of the present invention. The method 500 includes: configuring a cluster manager 203 for: dividing a user program 102 into a group of parallel execution tasks 302, and generating shuffling metadata 212 for mapping intermediate data 122 and processed data 119 from the parallel execution tasks 302 in a process 502; configuring a shuffling cluster node 204 for: storing the shuffling metadata 212, and incrementally shuffling each of the sub-packets 310 of the intermediate data 112 and the processed data 119 based on the shuffling metadata 212 when processing the parallel execution task 302 in a process 504; and mapping a local storage 120, through the shuffling metadata 212, for receiving the processed data 119 from the shuffling cluster node 204 in a process 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
    a cluster manager configured to:
        divide a user program into a group of parallel execution tasks, and
        generate shuffling metadata, before the parallel execution tasks are initiated, to map intermediate data and processed data from the parallel execution tasks;
    a shuffling cluster node, coupled to the cluster manager, comprising an in-storage computer (ISC) configured to:
        store the shuffling metadata, received from the cluster manager, by the ISC, and
        incrementally shuffle sub-packets of the intermediate data and the processed data, by the ISC, based on the shuffling metadata when the parallel execution task is in process to eliminate the need for a data shuffle period; and
    a local storage, coupled to the shuffling cluster node and mapped through the shuffling metadata, for receiving the sub-packets of the processed data from the shuffling cluster node.

2. The system as claimed in claim 1 wherein the cluster manager is configured to transmit the shuffling metadata to the ISC including a destination address provided for each of the intermediate data sub-packets generated by the sub-tasks of the parallel execution tasks.

3. The system as claimed in claim 1 wherein the shuffling cluster node is configured as a pre-processing client to generate the intermediate data.

4. The system as claimed in claim 1 wherein the shuffling cluster node is configured as a post-processing client to generate the processed data.

5. The system as claimed in claim 1 wherein the cluster manager configured to divide the user program into the group of the parallel execution tasks includes a plurality of sub-tasks defined for each of the parallel execution tasks.

6. The system as claimed in claim 1 wherein the shuffling cluster node includes an in-storage computer (ISC), coupled to a node storage engine, configured to monitor sub-tasks of the parallel execution tasks and transfer a data sub-packet of the intermediate data based on the shuffling metadata.

7. The system as claimed in claim 1 wherein the shuffling cluster node includes a node central processing unit (CPU), coupled to a node storage engine, configured to execute the parallel execution tasks.

8. The system as claimed in claim 1 wherein the shuffling cluster node includes the in-storage computer (ISC) configured to receive the shuffling metadata from a shuffling control unit.

9. The system as claimed in claim 1 wherein the shuffling cluster node includes an in-storage computer (ISC) configured to:
monitor sub-tasks of the parallel execution tasks;
transfer a data sub-packet of the intermediate data, based on a destination address from the shuffling metadata, at the completion of each of the sub-tasks; and
receive the data sub-packet as an input for an initial sub-task of a subsequent task without a data shuffle interval.

10. The system as claimed in claim 1 wherein the shuffling cluster node is configured as a post-processing client and includes the in-storage computer (ISC) configured to transfer processed data to an output file in the local storage.

11. A method of operation of an electronic system comprising:
receiving a host command by a storage device including:
configuring a cluster manager for:
dividing a user program into a group of parallel execution tasks, and generating shuffling metadata, before the parallel execution tasks are initiated, for mapping intermediate data and processed data from the parallel execution tasks;
configuring a shuffling cluster node comprising an in-storage computer (ISC) for:
storing the shuffling metadata, received from the cluster manager, by the ISC, and
incrementally shuffling sub-packets of the intermediate data and the processed data, by the ISC, based on the shuffling metadata when processing the parallel execution task to eliminate the need for a data shuffle period; and
mapping a local storage, through the shuffling metadata, for receiving the sub-packets of the processed data from the shuffling cluster node.

12. The method as claimed in claim 11 wherein dividing the user program into the group of the parallel execution tasks includes defining a group of sub-tasks within each of the parallel execution tasks.

13. The method as claimed in claim 11 wherein coupling the shuffling cluster node includes configuring the shuffling cluster node as a pre-processing client for generating the intermediate data.

14. The method as claimed in claim 11 wherein coupling the shuffling cluster node includes configuring the shuffling cluster node as a post-processing client for generating the processed data.

15. The method as claimed in claim 11 wherein dividing the user program into the group of the parallel execution tasks includes defining a plurality of sub-tasks for each of the parallel execution tasks.

16. The method as claimed in claim 11 wherein monitoring sub-tasks of the parallel execution tasks and transferring a data sub-packet of the intermediate data based on the shuffling metadata.

17. The method as claimed in claim 11 wherein configuring the shuffling cluster node for executing the parallel execution tasks including accessing a node storage engine by a node central processing unit (CPU).

18. The method as claimed in claim 11 wherein configuring the shuffling cluster node for storing the shuffling metadata includes receiving the shuffling metadata by an in-storage computer (ISC).

19. The method as claimed in claim 11 further comprising:
monitoring sub-tasks of the parallel execution tasks;
transferring a data sub-packet of the intermediate data based on a destination address from the shuffling metadata at the completion of each of the sub-tasks; and
receiving the data sub-packet as an input for an initial sub-task of a subsequent task without a data shuffle interval.

20. The method as claimed in claim 11 wherein transferring processed data to an output file in the local storage includes configuring an in-storage computer (ISC) for transferring the processed data.

* * * * *